US005677608A

United States Patent [19]

Greer et al.

[11] Patent Number: 5,677,608

[45] Date of Patent: Oct. 14, 1997

[54] EMBEDDED DUPLEX LOCAL CONTROL PANEL

[75] Inventors: David A. Greer, Simpsonville; John H. Corvin, Greer, both of S.C.

[73] Assignee: Westinghouse Air Brake Company, Wilmerding, Pa.

[21] Appl. No.: 558,657

[22] Filed: Nov. 16, 1995

[51] Int. Cl.[6] .................. G05B 5/00

[52] U.S. Cl. .................. 318/445; 307/10.1; 363/124; 361/160; 364/424.01

[58] Field of Search .................. 318/798–815, 318/445; 364/424.01, 424.05; 307/10.1, 112, 116, 139; 335/68; 361/160, 166, 167, 169.1, 170; 363/124

[56] References Cited

U.S. PATENT DOCUMENTS 4,551,601 11/1985 Nishimura .................. 364/424.01 X
4,679,508 7/1987 Fruehan et al. .................. 364/424.01 X

*Primary Examiner*—Karen Masih
*Attorney, Agent, or Firm*—James Ray & Associates

[57] ABSTRACT

A system for controlling the operation of a door comprising a first microprocessor and a second microprocessor each having a plurality of inputs for sensing the status of a vehicle. The plurality of inputs include a no motion trainline input, an open trainline input, an unlock trainline input and a close trainline input. The first microprocessor also has a close grant input for receiving a close grant signal from the second microprocessor while the second microprocessor also has a close request input for receiving a close request signal from the first microprocessor. The system also includes a motor for opening and closing the door and a motor relay circuit device, controlled by the microprocessors, for controlling the direction of power flow through the motor. When the motor relay circuit device activates, the motor is enabled to open the door and when it deactivates the motor is enabled to close the door. The system further includes a motor chopper control for controlling the delivery of power to the motor. The motor chopper control is controlled by the microprocessors so that when the motor relay circuit device activates, the motor chopper control delivers power to the motor to open the door and when it deactivates the motor chopper control delivers power to the motor to close the door. If at least one of the microprocessors detects a system malfunction, the motor chopper control will be disabled thereby preventing power flow to the motor and operation of the door.

19 Claims, 1 Drawing Sheet

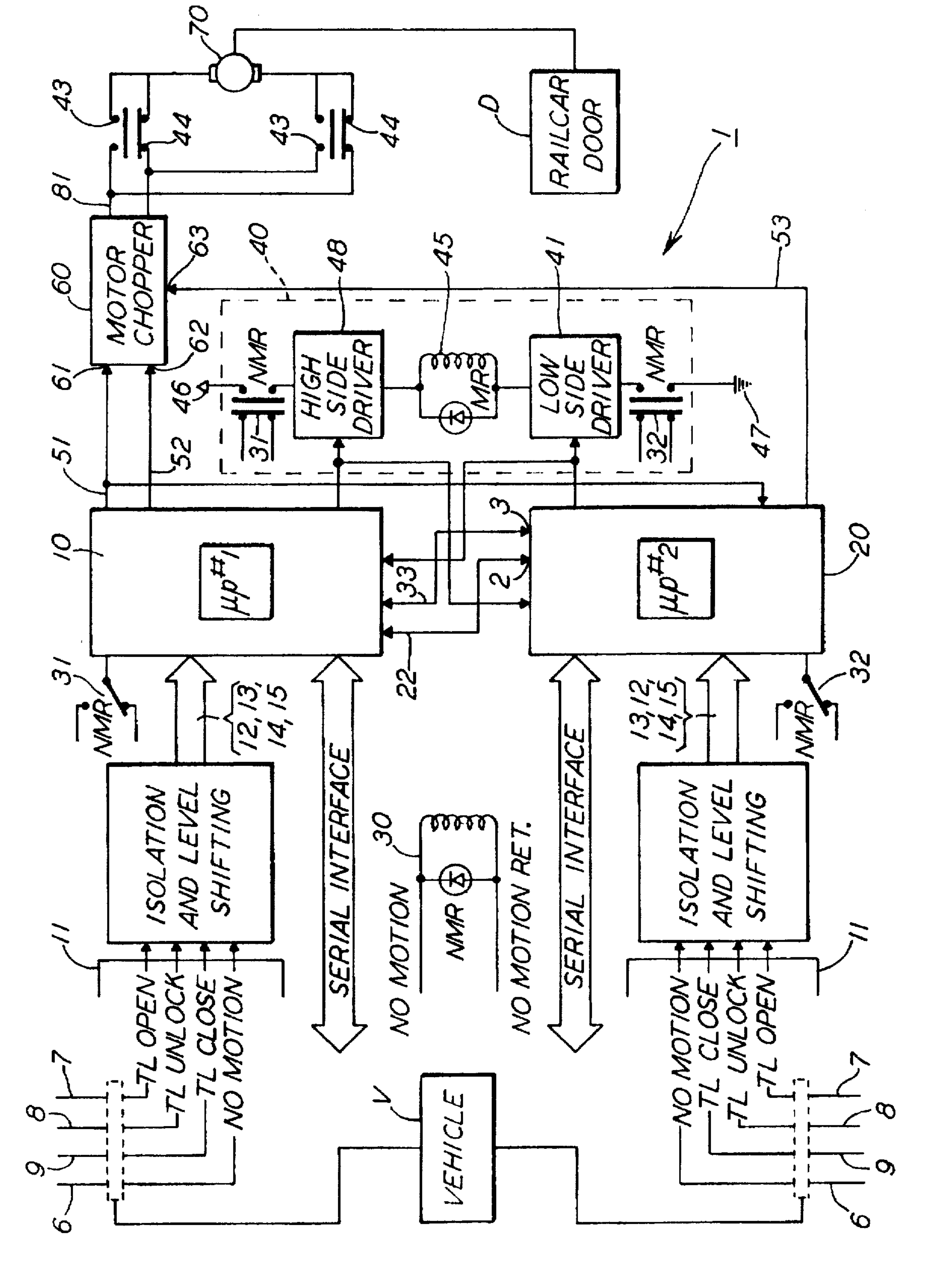
MOTOR CHOPPER
RAILCAR DOOR
NMR
HIGH SIDE DRIVER
MR
LOW SIDE DRIVER
μp#1
μp#2
ISOLATION AND LEVEL SHIFTING
ISOLATION AND LEVEL SHIFTING
SERIAL INTERFACE
SERIAL INTERFACE
NO MOTION
NO MOTION RET.
TL OPEN
TL UNLOCK
TL CLOSE
NO MOTION
VEHICLE

EMBEDDED DUPLEX LOCAL CONTROL PANEL

FIELD OF THE INVENTION

The present invention generally relates to a system used to control the operation of a train railcar overhead door and, more particularly, is concerned with a system for controlling the operation of such overhead railcar door through at least two microprocessors, each microprocessor being primarily employed to verify the operations of the other microprocessors so as to enable and to provide more reliable operation of such railcar door.

BACKGROUND OF THE INVENTION

As is generally well known in the field to which this invention pertains, railcar door control systems have been in widespread use in the railway and affiliated industries for several years prior to the present invention. Typically implemented in the form of a control panel to provide local control of a railcar door, such systems generally use old technology such as relays and other discrete logic devices to perform the logical functions requisite to the control of the opening and closing of such railcar door.

The present invention constitutes an advance over typical relay based railcar door controlling systems. As set forth in detail in the succeeding paragraphs, the present system uses at least two microprocessors rather than relays or other logic devices to perform the logical functions associated with the control and operation of an overhead railcar door. To enable door opening and closing operations, each of the employed microprocessors performs logical functions nearly identical to each of the other microprocessors used in the design. An advantage of such redundancy is that each of the microprocessors validates the operations of the other microprocessors thereby providing more reliable door opening and closing operations.

Such redundancy is not practical in relay based systems for several reasons. First, a railcar door controlling system which uses relays to perform logical functions as opposed to one or more microprocessors is inherently less reliable due to its mechanical nature and the number of components needed to implement its hardware intensive design. Second, a railcar door controlling system based on relays requires more physical space to implement than one based on microprocessors. Finally, the cost of a relay based system with its numerous components is prohibitive when compared to a railcar door controlling system based on microprocessors. Consequently, reliability, space and cost constraints alone recommend the present invention.

SUMMARY OF THE INVENTION

The present invention yields a solution to the above problems and provides a unique microprocessor based system for controlling the operation of a railcar door. In a presently preferred embodiment, the invention includes at least two microprocessors each performing a series of logical functions nearly identical to the other microprocessors so as to provide more reliable operation of such door. A first microprocessor has a plurality of inputs for sensing the status of a vehicle. The signals sensed by the plurality of inputs include a no motion trainline signal that when energized indicates that such vehicle is not in motion, an open trainline signal that when energized signals such door to open, an unlock trainline signal that when energized signals such door to unlock, and a close trainline signal that when energized signals such door to close. The first microprocessor also has inputs for sensing a close grant signal and a low side driver signal both from a second microprocessor. The second microprocessor likewise has the plurality of inputs for receiving the trainline signals as well as a close request input for receiving a close request signal from the first microprocessor and a high side driver input from the first microprocessor. The system further includes a motor relay circuit means for controlling the direction of power flow through a motor which serves to open and close such door. The motor is enabled to open such door when the motor relay circuit means is activated. Conversely, the motor is enabled to close such door when the motor relay circuit means is deactivated. The motor relay circuit means is activated when both the first and second microprocessors sense energization of the no motion, open and unlock trainlines. Similarly, the motor relay circuit means is deactivated when:one, the second microprocessor receives the close request signal from the first microprocessor and senses energization of the no motion and close trainlines and two, the first microprocessor receives the close grant signal from the second microprocessor and senses energization of the no motion and close trainlines. The motor relay circuit means is also deactivated when at least one of the first and second microprocessors detects a malfunction in the system. The system also includes a motor chopper control for controlling the delivery of power to the motor. The motor chopper control is controlled by the first and the second microprocessors. The motor chopper control delivers power to the motor to open such door when the motor relay circuit means is activated. Likewise, the motor chopper control delivers power to the motor to close such door when the motor relay circuit means is deactivated. If at least one of the first or second microprocessors detects a system malfunction, the motor chopper control will be disabled thereby preventing power flow to the motor to provide more reliable operation of such door.

OBJECTS OF THE INVENTION

A primary object of the present invention is to provide a system for controlling the operation of an overhead railcar door that uses at least two microprocessors, each microprocessor being generally employed to verify the operations of the other microprocessors so as to enable and to provide more reliable operation of such door.

Another object of the present invention is to provide a system for controlling the operation of an overhead railcar door that is programmable through software to perform automatically any number of tasks related to door operation.

Yet another object of the present invention is to provide a system for controlling the operation of an overhead railcar door whose software is alterable so that changes may be made to the operation of the system, and/or functions may be added to or deleted from the system, even after installation of the system.

Still yet another object of the present invention is to provide a system for controlling the operation of an overhead railcar door that can detect whether an obstruction exists at such door.

A further object of the present invention is to provide a system for controlling the operation of a railcar door that has built-in capabilities for diagnosing problems within the system.

Yet a further object of the present invention is to provide a system for controlling the operation of an overhead railcar door that has built-in capabilities for communicating with other communications equipped devices.

Even yet another object of the present invention is to provide a system for controlling the operation of an overhead railcar door whether such door is operated electrically, hydraulically, or pneumatically.

In addition to the various objects and advantages of the present invention described above, it should be noted that various other objects and advantages of the present invention will become more readily apparent to those persons who are skilled in the overhead railcar door controlling art from the detailed description of the invention, particularly, when such description is taken in conjunction with the attached drawing and with the appended claims.

BRIEF DESCRIPTION OF THE DRAWINGS

FIG. 1 is a block diagram of a microprocessor based system for controlling the operation of an overhead railcar door according to the present invention.

DETAILED DESCRIPTION OF THE INVENTION

Prior to proceeding to the detailed description of the instant invention, it should be noted for introductory purposes that each microprocessor as set forth in a presently preferred embodiment generally validates the operation of the other microprocessor before completing its operation. Furthermore, it is not necessary to relate herein the actual railcar door opening and closing process to understand the present invention.

Now referring to FIG. 1, illustrated therein are the essential details of the present microprocessor based system, generally designated 1, for controlling the operation of an overhead railcar door D. In the presently preferred embodiment, such railcar door controlling system 1 includes: a first microprocessor 10; a second microprocessor 20; a no motion relay 30; a motor relay circuit, generally designated 40, having a low side driver 41, a motor relay 45, a high side driver 48, and a first contact 31 and a second contact 32 both of the no motion relay 30; a motor chopper control 60; and a motor 70. The first microprocessor 10 has a plurality of inputs 11 for sensing the status of a vehicle V. The plurality of inputs 11 preferably includes:a no motion trainline input 12 for receiving a no motion trainline signal 6 that when energized indicates that such vehicle is not in motion; an open trainline input 13 for receiving an open trainline signal 7 that when energized signals such door to open; an unlock trainline input 14 for receiving an unlock trainline signal 8 that when energized signals such door to unlock; and a close trainline input 15 for receiving a close trainline signal 9 that when energized signals such door to close. The second microprocessor 20 also has the plurality of inputs 11 for receiving such trainline signals 6, 7, 8, and 9. Additionally, the second microprocessor 20 has a close request input 2 for receiving a close request signal 22 from the first microprocessor 10 and a close grant output 3 for transmitting a close grant signal 33 to the first microprocessor 10. The first contact 31 and the second contact 32 both close when such no motion trainline signal 6 is energized. Conversely, both first contact 31 and second contact 32 open when such no motion trainline signal 6 is deenergized. The first contact 31 and the second contact 32 of the no motion relay 30 are each monitored by the first and second microprocessors 10 and 20, respectively.

In the presently preferred embodiment, the motor relay circuit 40 is an essential part of the invented railcar door controlling system 1. The motor relay circuit 40 includes: the low side driver 41; the motor relay 45, the high side driver 48; and the first and the second contacts 31 and 32, respectively, of the no motion relay 30. The low side driver 41 is connected in series between the second contact 31 of the no motion relay 30 and the motor relay 45. The high side driver 48 is connected in series between the first contact 31 of the no motion relay 30 and the motor relay 45. The first contact 31 is connected in series between a battery feed 46 and the high side driver 48 and the second contact 32 is connected in series between a ground feed 47 and the low side driver 41.

The motor relay 45 of the motor relay circuit 40 has a set of normally open contacts 43 and a set of normally closed contacts 44. When the motor relay 45 is actuated, the motor relay 45 closes the normally open contacts 43 and opens the normally closed contacts 44 so that the motor 70 is enabled to allow power flow to open such railcar door. Conversely, when the motor relay 45 is deactuated, the motor relay 45 closes the normally closed contacts 44 and opens the normally open contacts 43 so that the motor 70 is enabled to allow power flow to close such railcar door.

More specifically, when such no motion open and unlock trainlines, 6, 7, and 8, respectively, energize and the first 31 and the second 32 contacts of the no motion relay 30 close, the first microprocessor 10 activates the high side driver 48 and the second microprocessor 20 activates the low side driver 41. With the low side and the high side drivers 41,48 both activated and the no motion relay contacts 31,32 both closed, the motor relay circuit 40 is activated thereby actuating the motor relay 45 to enable opening of such railcar door.

It should be mentioned that the first and the second microprocessors 10,20 monitor the low and high side drivers 41,48, respectively, for the purpose of detecting system malfunctions. The first microprocessor 10 will deactivate the high side driver 48 if the low side driver 41 is not activated within a predetermined time after activation of the high side driver 48. Likewise, the second microprocessor 20 will deactivate the low side driver 41 if the high side driver 48 is not activated within such predetermined time after activation of the low side driver 41.

When, however, such no motion and close trainlines 6 and 9, respectively, energize and the first 31 and the second 32 contacts of the no motion relay 30 close, the first microprocessor 10 sends such close request signal 22 to the second microprocessor 20. Upon receipt of such close request signal 22 in addition to having received the energization of such no motion and close trainlines 6 and 9 and having detected closure of the no motion relay contacts 31,32, the second microprocessor 20 will deactivate the low side driver 41 and send to the first microprocessor 10 such close grant signal 33. Whereupon receipt of such close grant signal 33 in addition to having received the energization of such no motion and close trainlines 6 and 9 and having detected closure of the no motion relay contacts 31,32, the first microprocessor 10 will deactivate the high side driver 48 thereby deactuating the motor relay 45 to enable closure of such railcar door. Note, however, that with at least one of the low side and/or the high side drivers 41,48 deactivated, the motor relay circuit 40 is deactivated thereby deactuating the motor relay 45 to enable closing of such railcar door.

In the presently preferred embodiment, the motor chopper control 60 is also an essential part of the invented railcar door controlling system 1. Whereas the motor relay circuit 40 serves to control the direction of power flow through the motor 70, the motor chopper control 60 serves to control the delivery of power to the motor 70 in response to commands received from the first and second microprocessors 10 and 20, respectively. The motor chopper control 60 includes: a power command input 61 for receiving a powering signal 51 from the first microprocessor 10; a first motor chopper control input 62 for receiving a first motor chopper control signal 52 from the first microprocessor 10; and a second motor chopper control input 63 for receiving a second motor chopper control signal 53 from the second microprocessor 20. Through such powering signal 51, the first microprocessor 10 controls the speed and torque of the motor 70. The motor chopper control 60 receives such powering signal 51 and utilizes such powering signal 51 to power the motor 70. Through such first motor chopper control signal 52, the first microprocessor 10 may either independently disable, or with the second microprocessor 20 jointly enable, the motor chopper control 60. Likewise, through second motor chopper control signal 53, the second microprocessor 20 may either independently disable, or with the first microprocessor 10 jointly enable, the motor chopper control 60.

More specifically, when such no motion, open and unlock trainlines 6, 7 and 8, respectively, energize, the no motion relay contacts 31,32 close and the low side driver 41 activates, the first microprocessor 10 sends such first motor chopper control signal 52 to the motor chopper control 60. Likewise, the second microprocessor 20 sends such second motor chopper control signal 53 upon energization of such no motion, open and unlock trainlines 6, 7 and 8, respectively, closure of the no motion relay contacts 31,32 and activation of the high side driver 48. The first and second microprocessors 10,20 thus jointly trigger the motor chopper control 60 to power the motor 70 to open such railcar door. The motor chopper control 60 so powers the motor 70 using such powering signal 51 received from the first microprocessor 10.

When, however, such no motion and close trainlines 6 and 9, respectively, energize and the first 31 and the second 32 contacts of the no motion relay 30 close, the first microprocessor 10 sends such first motor chopper control signal 52 to the motor chopper control 60. Likewise, upon energization of such no motion and close trainlines 6 and 9, respectively, and closure of the no motion relay contacts 31,32, the second microprocessor 20 sends such second motor chopper control signal 53 to the motor chopper control 60. The first and second microprocessors 10,20 thus jointly trigger the motor chopper control 60 to power the motor 70 to close such railcar door. The motor chopper control 60 so powers the motor 70 using such powering signal 51 received from the first microprocessor 10.

It should be noted that such powering signal 51 of the first microprocessor 10 may be chosen to be a pulse width modulated signal. In this case, the motor chopper control 60 may be used to convert such pulse width modulated signal to a corresponding analog signal 81 for output to and powering of the motor 70.

Alternatively, such powering signal 51 of the first microprocessor 10 may be chosen to be an analogue signal. In this case, the motor chopper control 60 may be employed to accept such analogue signal for transmission of a corresponding analog signal 81 for output to and powering of the motor 70.

It should further be noted that if at least one of the first and second microprocessors 10,20 detects a system malfunction, at least one of such first and second motor chopper control signals, 52 and 53, respectively, will be deenergized thereby disabling the motor chopper control 60 and preventing power flow to the motor 70.

When the door is fully opened or closed, the motor chopper control 60 is deactivated, thus making zero current flow through the motor relay 45 and reducing control power demand.

The railcar door controlling system 1 as set forth in the presently preferred embodiment above may also feature a means for communicating with another communications equipped device. Among other possibilities such a feature would allow monitoring of the railcar door controlling system 1 herein described from a remote location. The communication means may manifest itself in the form of either a serial communications apparatus or a parallel communications apparatus. The communications may likewise take the form of a wireless communications apparatus. Such apparatuses are commonly known in the communications industry and therefore are not further explained herein.

The railcar door controlling system 1 set forth herein may also feature programmable software. The software of the present invention could be programmed so that any number of tasks related to railcar door operation could be performed automatically. Examples of such tasks capable of being performed automatically are door obstruction detection, self diagnostic procedures and system test procedures.

It should also be noted that the railcar door controlling system 1 set forth herein may be used to control the operation of railcar door whether such door is operated electrically, hydraulically, or pneumatically.

While the presently preferred embodiment for carrying out the instant invention has been set forth in detail in accordance with the Patent Act, those persons skilled in the overhead railcar door controlling art to which this invention pertains will recognize various alternative ways of practicing the invention without departing from the spirit and scope of the appended claims.

Accordingly, to promote the progress of science and useful arts, we secure for ourselves by Letters Patent for a limited time exclusive rights to all subject matter embraced by the following claims.

We claim:

1. A system for controlling operation of a door, said system comprising:

(a) a first microprocessor having a predetermined plurality of inputs for sensing a status of a vehicle, said predetermined plurality of inputs at least including (i) a no motion trainline input for receiving a no motion trainline signal that when energized indicates that said vehicle is not in motion, (ii) an open trainline input for receiving an open trainline signal that when energized signals said door to open, (iii) an unlock trainline input for receiving an unlock trainline signal that when energized signals said door to unlock, and (iv) a close trainline input for receiving a close trainline signal that when energized signals said door to close, said first microprocessor also having (v) a close grant input for receiving a close grant signal, and (vi) a low side driver input for receiving a signal indicative of a state of a low side driver;

(b) a second microprocessor having (i) said predetermined plurality of inputs for receiving said trainline signals, (ii) a close request input for receiving a close request signal from said first microprocessor, and (iii) a high side driver input for receiving a signal indicative of a state of a high side driver;

(c) a motor for opening and closing said door;

(d) a motor relay circuit means, controlled by said first and second microprocessors, for controlling direction of power flow through said motor such that when said motor relay circuit means is activated said motor is enabled to open said door and when said motor relay circuit means is deactivated said motor is enabled to close said door, said motor relay circuit means being activated when both said first and second microprocessors sense energization of said no motion, open and unlock trainlines, said motor relay circuit means being deactivated when at least one of two conditions occur, specifically, firstly, said second microprocessor receives said close request signal from said first microprocessor and senses energization of said no motion and close trainlines and said first microprocessor receives said close grant signal from said second microprocessor and senses energization of said no motion and close trainlines and, secondly, at least one of said first and second microprocessors detect a malfunction in said system; and (e) a motor chopper control for controlling delivery of power to said motor, said motor chopper control controlled by said first and second microprocessors so that when said motor relay circuit means is activated said motor chopper control delivers power to said motor to open said door and when said motor relay circuit means is deactivated said motor chopper control delivers power to said motor to close said door;

wherein if at least one of said first and second microprocessors detects a malfunction in said system, said motor chopper control will be disabled thereby preventing power flow to said motor and operation of said door.

2. The door controlling system as recited in claim 1 wherein said motor relay circuit means includes:

(a) a motor relay having a set of normally open contacts and a set of normally closed contacts, said motor relay when actuated closes said normally open contacts and opens said normally closed contacts so that said motor is enabled to allow power flow to open said door, said motor relay when deactuated closes said normally closed contacts and opens said normally open contacts so that said motor is enabled to allow power flow to close said door;

(b) a no motion relay having a first contact and a second contact each of which closes when said no motion trainline signal is energized and which opens when said no motion trainline signal is deenergized, each of said no motion relay contacts being monitored by said first and second microprocessors;

(c) said low side driver having an input from said second microprocessor and an output to said first microprocessor, said low side driver being in series between said second contact of said no motion relay and said motor relay, said second contact of said no motion relay being in series between a ground feed and said low side driver; and (d) said high side driver having an input from said first microprocessor and an output to said second microprocessor, said high side driver being in series between said first contact of said no motion relay and said motor relay, said first contact of said no motion relay being in series between a battery feed and said high side driver;

such that when said no motion, open and unlock trainlines energize and said no motion relay contacts close, said first microprocessor activates said high side driver and said second microprocessor activates said low side driver thereby actuating said motor relay and thus activating said motor relay circuit means to enable opening of said door, said first and second microprocessors monitoring said low and high side drivers, respectively, so that said first microprocessor deactivates said high side driver if said low side driver is not activated within a predetermined time after activation of said high side driver and said second microprocessor deactivates said low side driver if said high side driver is not activated within said predetermined time after activation of said low side driver, and such that when said no motion and close trainlines energize and said no motion relay contacts close, said first microprocessor sends said close request signal to said second microprocessor whereupon said second microprocessor upon energization of said no motion and close trainlines, closure of said no motion relay contacts and receipt of said close request signal deactivates said low side driver and sends to said first microprocessor said close grant signal whereupon said first microprocessor upon energization of said no motion and close trainlines, closure of said no motion relay contacts and receipt of said close grant signal deactivates said high side driver thereby deactuating said motor relay to enable closure of said door, said motor relay circuit means being deactivated when at least one of said low and high side drivers is deactivated.

3. The door controlling system as recited in claim 1 wherein said motor chopper control includes:

(a) a power command input for receiving a powering signal from said first microprocessor through which said first microprocessor controls a speed and torque of said motor;

(b) a first motor chopper control input for receiving a first motor chopper control signal from said first microprocessor through which said first microprocessor may either independently disable, or with said second microprocessor jointly enable, said motor chopper control; and (c) a second motor chopper control input for receiving a second motor chopper control signal from said second microprocessor through which said second microprocessor may either independently disable, or with said first microprocessor jointly enable, said motor chopper control;

such that when said no motion, open and unlock trainlines energize, said no motion relay contacts close and said motor relay circuit means activates, said first microprocessor sends said first motor chopper control signal to said motor chopper control and likewise said second microprocessor sends said second motor chopper control signal upon energization of said no motion, open and unlock trainlines, closure of said no motion relay contacts and activation of said motor relay circuit means, said first and second microprocessors thus jointly trigger said motor chopper control to power said motor to open said door via said powering signal, and such that when said no motion and close trainlines energize and said no motion relay contacts close, said first microprocessor sends said first motor chopper control signal to said motor chopper control and likewise said second microprocessor sends said second motor chopper control signal upon energization of said no motion and close trainlines and closure of said no motion relay contacts, said first and second microprocessors thus jointly trigger said motor chopper control to power said motor to close said door via said powering signal.

4. The door controlling system as recited in claim 3 wherein said powering signal is a pulse width modulated signal through which said first microprocessor controls said speed and torque of said motor, said motor chopper control for converting said pulse width modulated signal to a corresponding analog signal for output to and powering of said motor.

5. The door controlling system as recited in claim 3 wherein said powering signal is an analogue signal through which said first microprocessor controls said speed and torque of said motor, said motor chopper control for using said analogue signal to transmit a corresponding analog signal for output to and powering of said motor.

6. The door controlling system as recited in claim 1 wherein said system has a means for communicating with another communications equipped device.

7. The door controlling system as recited in claim 6 wherein said communicating means is a serial communications apparatus.

8. The door controlling system as recited in claim 6 wherein said communicating means is a parallel communications apparatus.

9. The door controlling system as recited in claim 6 wherein said communicating means is a wireless communications apparatus.

10. The door controlling system as recited in claim 1 wherein said system is programmable through software to perform automatically any number of tasks related to door operation.

11. The door controlling system as recited in claim 1 wherein said system can detect whether an obstruction exists at said door.

12. The door controlling system as recited in claim 1 wherein said system has built-in capabilities for diagnosing problems within said system.

13. A system for controlling operation of a door, said system comprising:

(a) a first microprocessor having a predetermined plurality of inputs for sensing a status of a vehicle, said predetermined plurality of inputs at least including
 (i) a no motion trainline input for receiving a no motion trainline signal that when energized indicates that said vehicle is not in motion,
 (ii) an open trainline input for receiving an open trainline signal that when energized signals said door to open,
 (iii) an unlock trainline input for receiving an unlock trainline signal that when energized signals said door to unlock, and
 (iv) a close trainline input for receiving a close trainline signal that when energized signals said door to close,
 said first microprocessor also having
 (v) a close grant input for receiving a close grant signal, and
 (vi) a low side driver input for receiving a signal indicative of a state of a low side driver;
(b) a second microprocessor having
 (i) said predetermined plurality of inputs for receiving said trainline signals,
 (ii) a close request input for receiving a close request signal from said first microprocessor, and
 (iii) a high side driver input for receiving a signal indicative of a state of a high side driver;
(c) a no motion relay having a first contact and a second contact each of which closes when said no motion trainline signal is energized and which opens when said no motion trainline signal is deenergized, each of said no motion relay contacts being monitored by said first and second microprocessors;
(d) a motor for opening and closing said door;
(e) a motor relay circuit having:
 (i) a motor relay having a set of normally open contacts and a set of normally closed contacts, said motor relay when actuated closes said normally open contacts and opens said normally closed contacts so that said motor is enabled to allow power flow to open said door, said motor relay when deactuated closes said normally closed contacts and opens said normally open contacts so that said motor is enabled to allow power flow to close said door,
 (ii) said low side driver having an input from said second microprocessor and an output to said first microprocessor, said low side driver being in series between said second contact of said no motion relay and said motor relay,
 (iii) said high side driver having an input from said first microprocessor and an output to said second microprocessor, said high side driver being in series between said first contact of said no motion relay and said motor relay,
 (iv) said first contact of said no motion relay being in series between a battery feed and said high side driver, and
 (v) said second contact of said no motion relay being in series between a ground feed and said low side driver, such that when said no motion, open and unlock trainlines energize and said no motion relay contacts close, said first microprocessor activates said high side driver and said second microprocessor activates said low side driver thereby actuating said motor relay to enable opening of said door, said first and second microprocessors monitoring said low and high side drivers, respectively, so that said first microprocessor deactivates said high side driver if said low side driver is not activated within a predetermined time after activation of said high side driver and said second microprocessor deactivates said low side driver if said high side driver is not activated within said predetermined time after activation of said low side driver, and such that when said no motion and close trainlines energize and said no motion relay contacts close, said first microprocessor sends said close request signal to said second microprocessor whereupon said second microprocessor upon energization of said no motion and close trainlines, closure of said no motion relay contacts and receipt of said close request signal deactivates said low side driver and sends to said first microprocessor said close grant signal whereupon said first microprocessor upon energization of said no motion and close trainlines, closure of said no motion relay contacts and receipt of said close grant signal deactivates said high side driver thereby deactuating said motor relay to enable closure of said door, said motor relay being deactivated when at least one of said low and high side drivers is deactivated; and f) a motor chopper control having:
 (i) a power command input for receiving a powering signal from said first microprocessor through which said first microprocessor controls said speed and torque of said motor;
 (ii) a first motor chopper control input for receiving a first motor chopper control signal from said first microprocessor through which said first microprocessor may either independently disable, or with said second microprocessor jointly enable, said motor chopper control, and (iii) a second motor chopper control input for receiving a second motor chopper control signal from said second microprocessor through which said second microprocessor may either independently disable, or with said first microprocessor jointly enable, said motor chopper control, such that when said no motion, open and unlock trainlines energize, said no motion relay contacts close and said low side driver activates, said first microprocessor sends said first motor chopper control signal to said motor chopper control and likewise said second microprocessor sends said second motor chopper control signal upon energization of said no motion, open and unlock trainlines, closure of said no motion relay contacts and activation of said high side driver, said first and second microprocessors thus jointly trigger said motor chopper control to power said motor to open said door via said powering signal, and such that when said no motion and close trainlines energize and said no motion relay contacts close, said first microprocessor sends said first motor chopper control signal to said motor chopper control and likewise said second microprocessor sends said second motor chopper control signal upon energization of said no motion and close trainlines and closure of said no motion relay contacts, said first and second microprocessors thus jointly trigger said motor chopper control to power said motor to close said door via said powering signal;

wherein if at least one of said first and second microprocessors detects a malfunction in said system, at least one of first and second motor chopper control signals, respectively, will be deenergized thereby disabling said motor chopper control and preventing power flow to said motor and operation of said door.

14. The door controlling system as recited in claim 13 wherein said system has a means for communicating with another communications equipped device.

15. The door controlling system as recited in claim 13 wherein said powering signal is a pulse width modulated signal through which said first microprocessor controls said speed and torque of said motor, said motor chopper control for converting said pulse width modulated signal to a corresponding analog signal for output to and powering of said motor.

16. The door controlling system as recited in claim 13 wherein said powering signal is an analog signal through which said first microprocessor controls said speed and torque of said motor, said motor chopper control using said analogue signal to transmit a corresponding analog signal for output to and powering of said motor.

17. The door controlling system as recited in claim 13 wherein said system is programmable through software to perform automatically any number of tasks related to door operation.

18. The door controlling system as recited in claim 13 wherein said system can detect whether an obstruction exists at said door.

19. The door controlling system as recited in claim 13 wherein said system has built-in capabilities for self diagnosis of problems within said system.

* * * * *